Sept. 6, 1966 H. R. WHITE 3,271,540
TURN SIGNALING CANCELING MECHANISM
Filed Sept. 9, 1964 2 Sheets-Sheet 1
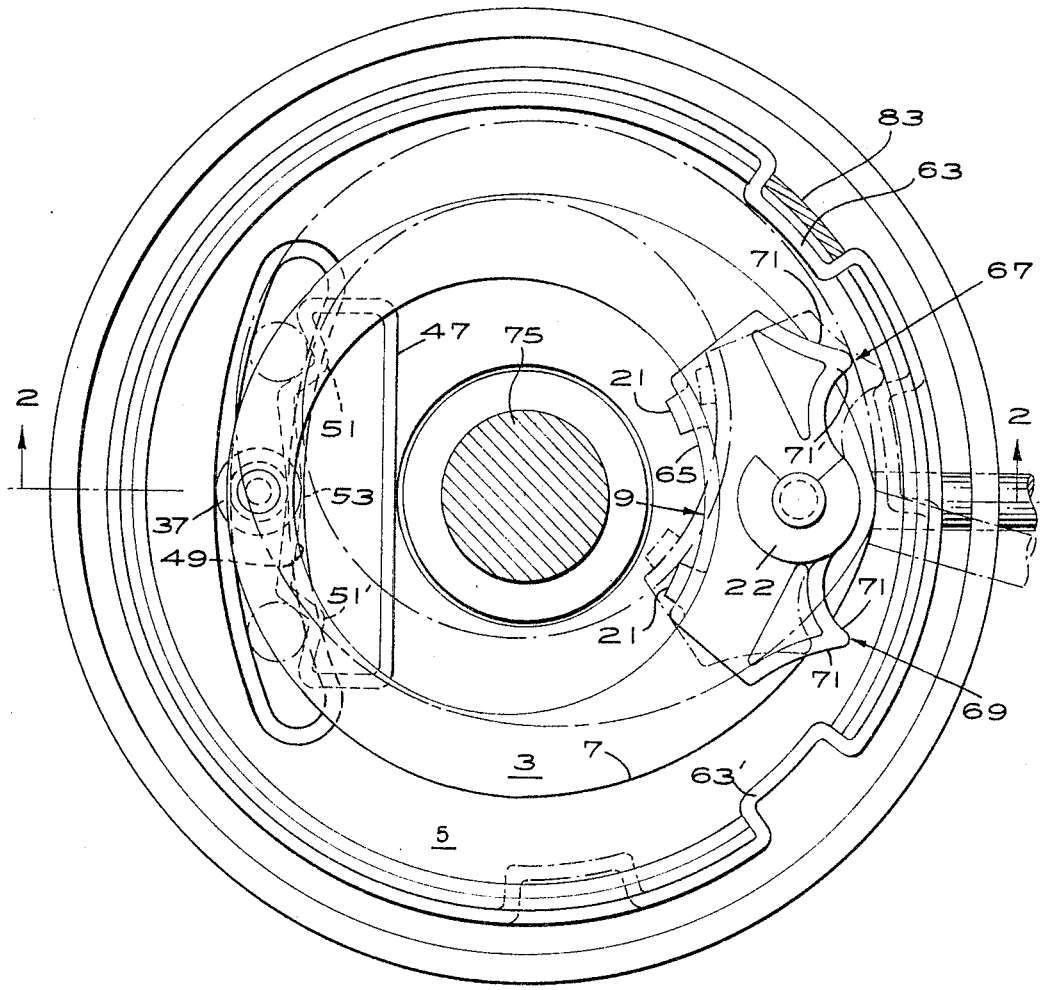
HUGH R. WHITE
INVENTOR.
BY John R. Faulkner
Keith L. Zerschling
ATTORNEYS

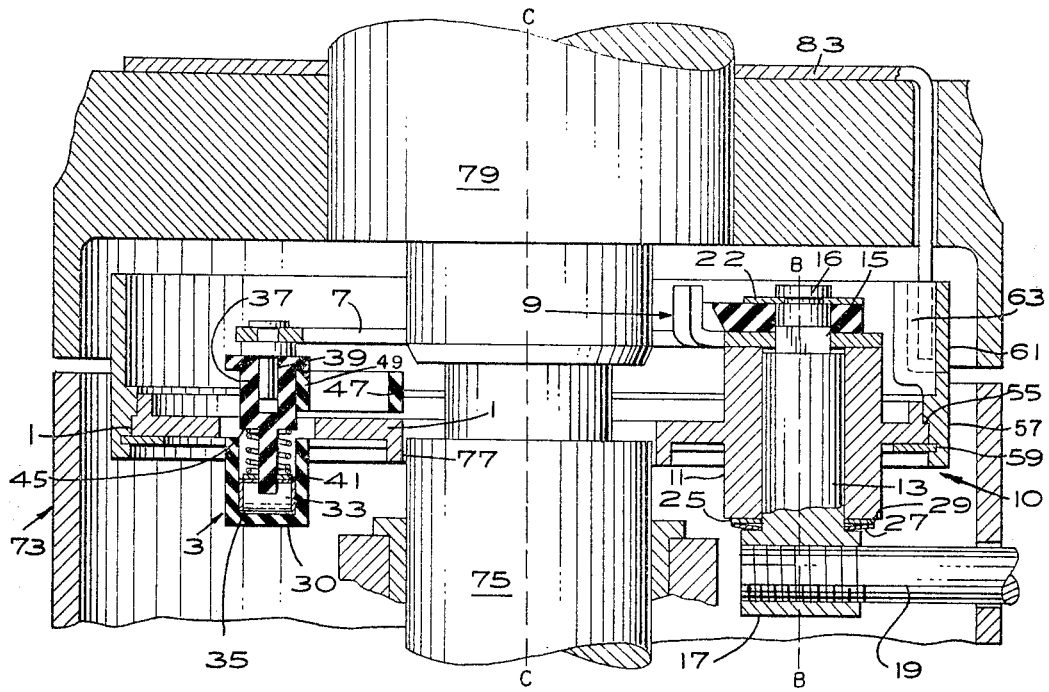
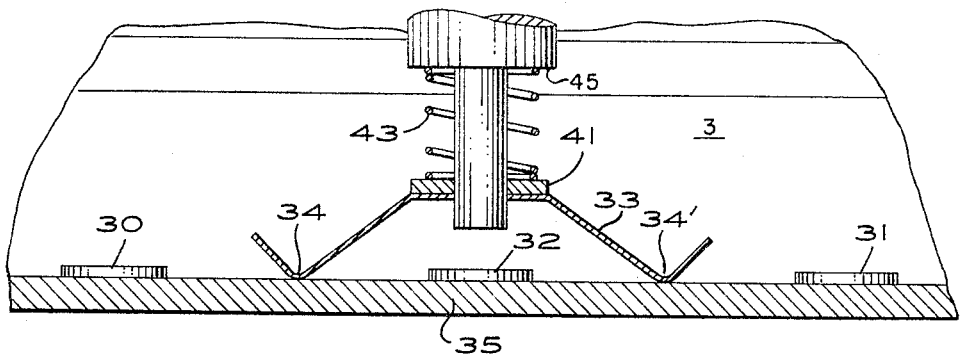

United States Patent Office 3,271,540
Patented Sept. 6, 1966

3,271,540
TURN SIGNALING CANCELING MECHANISM
Hugh R. White, Chelmsford, England, assignor to The Ford Motor Company, Dearborn, Mich., a corporation of Delaware
Filed Sept. 9, 1964, Ser. No. 395,114
9 Claims. (Cl. 200—61.34)

This invention relates to direction indicator switch mechanisms for motor vehicles.

A known switch mechanism has a switch member which is movable in opposite directions about a "switch-open" position to one or the other of two "switch-closed" positions at which one or the other of two direction indicator circuits are respectively adapted to be closed; a manual arm which is operative to move the switch member; and a cancelling device which is adapted to be moved relatively to the switch member by the steering wheel and which, after the switch member has been moved to a "switch-closed" position, engages but is unable to affect the setting of the switch member when the steering wheel is moved in the same direction as the arm but which, on subsequent reversal of the steering wheel engages and is operative to move the switch member to the "switch-open" position. In the known mechanism the cancelling device is mounted on the steering column of the vehicle and the remainder of the mechanism is mounted on the shroud of the steering column.

In order to ensure correct cancelling operation of the mechanism the switch member must be accurately positioned in a radial direction relatively to the cancelling device. It is impractical, with a mass-produced article such as a motor vehicle, to set such radial tolerances on the positioning of the steering column and the steering column shroud as will ensure that the switch member is necessarily moved to the "switch-open" position, so as to open a direction indicating circuit, irrespective of the vehicle to which the mechanism is attached. As a result it is sometimes necessary during vehicle assembly to carefully adjust the position of the cancelling device relatively to the switch member in order to ensure correct cancelling of the direction indicator circuit.

According to the present invention a direction indicator switch assembly is adapted to be fitted as a unit to a relatively fixed part of the vehicle. Since the switch is assembled as a unit, tolerances, in particular radial tolerances, between the switch member and the cancelling device are capable of being readily controlled and without reference to other parts of the vehicle not subject to the same stringent tolerances.

Preferably the switch member is attached to a base member and is adapted to be moved relatively to the base member by the manual arm; the base member is adapted to be secured to a relatively fixed part of the vehicle; and the cancelling device is attached to the base member and is adapted to be moved relatively to the base member by the steering wheel.

Preferably the base member is an annular plate which is adapted to be secured to a relatively fixed part of the vehicle with the steering column extending through its central opening; the switch member is pivoted on the annular plate about an axis parallel to but distinct from the axis of the plate; and the cancelling device is in the general form of a ring which is attached to the base member around the periphery of the base member and which is adapted to be rotated relatively to the base member by the steering wheel.

Preferably the cancelling device has two spaced-apart switch cancelling portions; the switch member carries a device which has two spaced parts and which is constructed, adapted or arranged such that when the switch member is in a "switch-closed" position one of its spaced parts lies in the path of movement of a corresponding one of the switch-cancelling portions; when, with a spaced part so located, the part is engaged by its corresponding cancelling portion during movement of the cancelling device in the direction of the manual arm, the device, carried on the switch member, resiliently yields so as to permit the cancelling portion to ride over the device without affecting the "switch-closed" setting of the switch member; and when the part is engaged by the cancelling portion during subsequent reversal of the steering wheel, the device behaves as a substantially rigid member and is moved by the cancelling portion and, in moving, moves the switch member to the "switch-open" position.

Preferably the device carried by the switch member is a one-piece element which is resiliently deformed by engagement of the cancelling portion with the corresponding spaced part of the element so as to permit the cancelling device to ride over element during movement of the cancelling device in the direction of the manual arm.

Advantageously the one-piece element is such that when the part is engaged during reversal of the steering wheel and the manual arm is held the element is resiliently deformed so as to permit the cancelling portion to ride over the part without affecting the "switch-closed" setting of the switch arm.

Conveniently the one-piece element is made of a plastic material. Preferably the switch member is biased against movement from the "switch-open" to a "switch-closed" position, or vice-versa, by a switch member indexing device. Conveniently the indexing device is a one-piece resilient plate element which is secured to the base member and which is formed with three contiguous recessed portions the middle one of which corresponds to the "switch-open" position and the outer ones of which respectively correspond to the "switch-closed" positions; and the switch member has a part which is adapted to be latched in the "switch-open" or in a "switch-closed" position by resilient engagement of the wall of the corresponding recess with the part.

Conveniently the plate element is made of a plastic material.

Preferably the base member carries a pair of spaced contacts and the switch member carries a contact which is adapted to "make" with one or the other of the base member contacts when the switch arm is moved from the "switch-open" to a "switch-closed" position.

The invention is hereinafter particularly described with reference to the accompanying drawings in which:

FIG. 1 is a plan view, on an enlarged scale, of a direction indicator switch assembly, FIG. 2 is a sectional elevation on the line 2—2 of FIG. 1 and FIG. 3 is a schematic diagram of the switch.

The mechanism comprises a die-cast annular base member 1; an electric switch 3; a switch member 5 which comprises an annular switch arm 7 pivoted on the base member 1 about an axis B—B parallel to but distinct from the axis C—C of the base member; a plastic moulding 9 also pivoted on the base member 1 about the axis B; and a cancelling device 10.

The pivot for the switch 7 comprises a cylindrical boss 11 integral with the base member 1 and a pivot pin 13 which extends through the boss 11. The upper end of the pin 13 has a square shaft portion 15 and a cylindrical shaft portion 16 and the lower end of the pin has an eye 17 within which is located the end of a manual arm 19. The square shaft portion 15 projects through a square aperture in the switch arm 7 and the moulding 9 is located on the cylindrical shaft portion 16. The switch arm 27 has a pair of upstanding lugs 21 which prevent relative rotation between the moulding 9 and the switch arm; and the pivot pin 13 is located axially of the boss 11 by a C-clip 22 which is located in a groove in the cylindrical shaft portion 16 and by a plain washer 25 and a Belleville washer 27 which are located on the lower end of the pin between the eye 17 and the bottom endface 29 of the boss.

The switch 3 has three fixed contacts 30, 31 and 32 and a movable contact 33. The fixed contacts 30 and 31 are located towards the ends of the bottom surface of a moulded plastic chamber 35 which is of arcuate form and which is secured within an arcuate opening in the base member 1. The movable contact 33 is a leaf spring which has two contact portions 34 and 34' (FIG. 3) and which is located on the spigoted end of a nylon roller 37 located on a spindle 39 attached to the switch arm 7. A washer 41 is located on the spigoted end of the roller 37 and a coil spring 43 engages the washer 41 and a shoulder 45 on the roller so as to urge the movable contact 33 towards the bottom of the chamber 35.

A resilient switch indexing element 47, in the form of a plastic tube, is secured to the base member 1. One wall 49 of the indexing element has three contiguous recessed portions 51, 53 and 51'. The roller 37 is resiliently engaged by the wall 49. When the roller is located in the middle recess 53 the movable contact 33 is in the "switch-open" position, the two contact portions 34, 34' of the contact 33 being positioned between the central contact 32 and the contacts 30 and 31. When the roller is located in one or the other of the outermost recesses 51 or 51' the movable contact 33 is in a "switch-closed" position at which the movable contact bridges the central contact 32 and one or the other of the contacts 30 and 31.

The cancelling device 10 is in the general form of a ring which extends around and projects upwardly from the periphery of the base member 1 and which is axially located on the base member by engagement of an internal shoulder 55 on the ring with a shoulder 57 around the periphery of the base member and by a circlip 59 which is located in an annular groove in the cancelling ring. That part 61 of the cancelling ring which is above the base member has two inwardly projecting indentations 63 and 63' which are spaced 90° apart. The cancelling ring is circumferentially positioned such that when the steering wheel is in the neutral steer position the indentations 63, 63' are located on either side of the moulding 9 at the positions shown, in ghost, in FIG. 1.

The moulding 9 has two, generally V-shaped, web portions 67 and 69. The walls 71 and 71' of the web portion 67 respectively corresponding in contour and inclination to the similarly numbered walls of the web portion 69.

The base plate 1 is secured to internal lugs (not shown) on the steering column shroud 73. The steering column 75 extends through the central opening 77 in the base plate 1. Rotation of the steering wheel 79 relatively to the steering column is prevented by the engagement of splines (not shown) on the wheel and the column and axial movement of the wheel relatively to the steering column is prevented by a nut and tag washer connection (not shown) at the end of the steering column. The tag washer has an extension 83 the free end of which is located in one of the indentations 63 of the cancelling ring so that movement of the steering wheel correspondingly rotates the cancelling ring 10 relatively to the base number 1.

When the manual arm 19 lies on the line 2—2 (FIG. 1) the position of the switch arm 7 is such that the roller 37 is located in the middle indexing recess 53 of the element 47 and as a result the switch arm 7 is in the "switch-open" position.

When the manual arm 19 is roated in a clockwise sense (FIG. 1) the switch arm 7 and the moulding 9 are rotated. When the switch arm 7 is rotated the wall 49 of indexing element 47 is deflected inwardly by the roller 37. When the crest of the recessed portion 53 is traversed by the roller the indexing element moves outwardly so as to cause the roller to latch into the recessed portion 51 thereby to locate the switch arm in a "switch-closed" position at which the movable contact 33 bridges the central contact 32 and one or the other of the contacts 30, 31 so as to complete one or the other of two direction indicator circuits (not shown).

When the roller is so latched the web portion 67 of the moulding 9 lies in the path of movement of the indentation 63 in the cancelling ring. When the steering wheel is rotated in the direction of the manual arm 19 the indentation 63 engages the wall 71 of the web portion. The inclination of the wall 71 relatively to the path of movement of the indentation is such that, when engaged by the indentation, the web portion 67 is deflected so as to permit the indentation 63 to ride over the moulding 9. As a result of the engagement of the indentation 63 with the wall 71 there is a rotational force on the switch arm. However, due to the steepness of the wall of the recessed portion 51 in the indexing element 47 the rotational force is insufficient to affect the setting of the switch arm.

During subsequent reversal of the steering wheel the indentation 63 engages the wall 71' of the web portion 67. The inclination of the wall 71' relatively to the path of travel of the indentation is such that the moulding 9 behaves as a substantially rigid member. As a result the rotational force on the moulding 9 is greater than the opposing force due to indexing element 47 and the switch arm is rotated until the roller latches in the middle recess 53 of the element and the movable contact is, accordingly, set to the "switch-open" position.

If, however, the manual arm 19 is held in the position corresponding to the "switch-closed" position of the switch arm 7 when during the subsequent reversal of the steering wheel, the wall 71' is engaged, the web portion 67 is deflected so as the permit the indentation to ride over the web portion without affecting the setting of the switch arm 7.

It is to be understood that this invention is not to be limited to the exact construction shown and described but that various changes and modifications may be made without departing from the spirit and scope of the invention as defined in the appended claims.

What is claimed is:

1. In a turn signaling mechanism, a steering shaft, a base member fixedly mounted and having a central aperture, said steering shaft extending through said central aperture, an electric switch comprising a fixed portion mounted on said base member and a movable portion, a switch member carrying said movable portion of said electrical switch and being pivotally mounted on said base member about an axis offset with respect to the axis of said steering shaft, a manual arm affixed to said switch member for moving said movable portion of said electrical switch in opposite directions about a switch-open position to one or the other of two switch-closed positions, indexing means mounted on said base member, means mounted on said switch member and engaging said indexing means for holding said switch member and said movable portion of said switch in one or the other of said two closed positions, a cylindrical canceling ring rotatably mounted on said base member, means connecting said cylindrical canceling ring and said steering shaft whereby said cylindrical canceling ring rotates with said steering shaft, said canceling ring having two spaced projections extending inwardly therefrom toward said steering shaft, and resilient means mounted on said switch member and movable therewith and engaging said projections on said canceling ring for returning said switch member and said movable portion of said electrical switch to the switch-open position when said steering shaft is rotated in a direction opposite to the movement of said manual operating arm when said switch member is moved from a switch-open to a switch-closed position.

2. The combination of claim 1 in which said indexing means comprises a resilient tube having three contiguous recessed portions and said means mounted on said switch member and engaging said indexing means comprising a roller rotatably mounted on a spindle carried by said switch member.

3. The combination of claim 1 in which said resilient means comprises a one piece plastic element including means which are resiliently deformed by engagement of said projections on said canceling ring during movement of said canceling ring by rotation of said steering shaft in the same direction as said manual operating arm is moved when said switch member is moved from a switch-open to a switch-closed position.

4. The combination of claim 1 in which the outer periphery of said base member is cylindrical and said cylindrical canceling ring is rotatably mounted on the outer periphery of said base member about an axis parallel to the axis of said steering shaft.

5. The combination of claim 1 in which said resilient means comprises a one piece plastic element, including means which are resiliently deformed by engagement of said projections of said canceling ring during movement of said canceling ring by rotation of said steering shaft in the same direction as said manual operating arm is moved when said switch member is moved from a switch-open to a switch-closed position, and in which the outer periphery of said base member is cylindrical, said cylindrical canceling ring is rotatably mounted on the outer periphery of said base member and said two spaced projections are positioned approximately 90° apart on the periphery of said canceling ring and substantially equidistant from said one piece plastic element when said switch member is in the switch-open position.

6. In a turn signaling mechanism, a vehicle steering member, said steering member having a zero position for steering the vehicle in a straight path, a base member fixedly mounted and having a central aperture, said steering member extending through said central aperture, a movable switch member pivotally mounted on said base member, said switch member having an operative and an inoperative position, a manual arm connected to said switch member for moving said switch member from an operative to an inoperative position, a cylindrical canceling ring rotatably mounted on said base member about an axis concentric to the axis of said steering member, said cylindrical canceling ring having a pair of spaced inwardly extending projections, means connecting said cylindrical canceling ring and said steering member whereby said cylindrical canceling ring rotates with said steering member, and resilient means mounted on said switch member and engaging said projections on said cylindrical canceling ring for returning said switch member to the inoperative position when said steering member is rotated in the opposite direction of the movement of said manual arm when said switch member is moved from an inoperative to an operative position.

7. The combination of claim 6 in which the outer periphery of said base member is cylindrical and said cylindrical canceling ring is rotatably mounted on the outer periphery of said base member.

8. The combination of claim 6 in which said resilient means comprises a one piece plastic element including means which are resiliently deformed by engagement of said projections on said canceling ring during movement of said canceling ring by rotation of said steering member in the same direction as said manual arm is moved when said switch member is moved from an inoperative to an operative position.

9. The combination of claim 6 in which said resilient means is positioned substantially equidistantly between the projections on said cylindrical canceling ring when said switch member is in an inoperative position and said projections are positioned approximately 90° apart on the periphery of said cylindrical canceling ring.

References Cited by the Examiner
UNITED STATES PATENTS

| | | | |
|---|---|---|---|
| 2,724,750 | 11/1955 | Brown | 200—61.34 |
| 2,800,541 | 7/1957 | Brown et al. | 200—61.34 |

BERNARD A. GILHEANY, *Primary Examiner.*

H. A. LEWITTER, *Assistant Examiner.*

UNITED STATES PATENT OFFICE

Certificate

Patent No. 3,271,540            Patented September 6, 1966

Hugh R. White

Application having been made by Hugh R. White, the inventor named in the patent above identified; The Ford Motor Company, Dearborn, Michigan, a corporation of Delaware, the assignee; and Kenneth D. Hewett of Essex, England, for the issuance of a certificate under the provisions of Title 35, Section 256 of the United States Code, adding the name of the said Kenneth D. Hewett as a joint inventor, and a showing and proof of facts satisfying the requirements of the said section having been submitted, it is this 31st day of October 1967, certified that the name of the said Kenneth D. Hewett is hereby added to the said patent as a joint inventor with the said Hugh R. White.

[SEAL]

EDWIN L. REYNOLDS,
*First Assistant Commissioner of Patents.*